(12) United States Patent
Amuduri et al.

(10) Patent No.: US 11,910,266 B2
(45) Date of Patent: Feb. 20, 2024

(54) METHOD OF CONTROLLING ACCESS

(71) Applicant: Carrier Corporation, Palm Beach Gardens, FL (US)

(72) Inventors: Santhosh Amuduri, Telangana (IN); Srinivasa Rao Veeravalli, Telangana (IN); Subhash Reddy Gopavaram, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/464,000

(22) Filed: Sep. 1, 2021

(65) Prior Publication Data

US 2022/0078576 A1   Mar. 10, 2022

(30) Foreign Application Priority Data

Sep. 4, 2020 (IN) ............................. 202011038142

(51) Int. Cl.
*H04W 4/021* (2018.01)
*G07C 9/00* (2020.01)
*G01J 5/00* (2022.01)

(52) U.S. Cl.
CPC ........ *H04W 4/021* (2013.01); *G07C 9/00563* (2013.01); *G01J 5/0025* (2013.01)

(58) Field of Classification Search
CPC ..... H04W 4/021; G07C 9/00563; G07C 9/27; G07C 9/22; G01J 5/0025
See application file for complete search history.

(56) References Cited

U.S. PATENT DOCUMENTS

| | | | |
|---|---|---|---|
| 10,060,802 B1* | 8/2018 | Ragosta | G01K 1/022 |
| 11,004,283 B1* | 5/2021 | Doherty | G07C 9/37 |
| 11,113,913 B1* | 9/2021 | Doherty | H04L 67/12 |
| 11,204,281 B1* | 12/2021 | Ouellette | G08B 21/182 |
| 11,282,318 B1* | 3/2022 | Swierszcz | G07C 9/25 |
| 2002/0067259 A1* | 6/2002 | Fufidio | G07C 9/28 |
| | | | 340/541 |
| 2013/0072814 A1* | 3/2013 | Kuo | A61B 5/0022 |
| | | | 600/549 |
| 2016/0344091 A1 | 11/2016 | Trani | |
| 2021/0335071 A1* | 10/2021 | Nam | G06V 20/52 |

(Continued)

FOREIGN PATENT DOCUMENTS

| | | |
|---|---|---|
| CN | 206726313 U | 12/2017 |
| CN | 111195365 A | 5/2020 |
| WO | 2008073562 A1 | 6/2008 |

OTHER PUBLICATIONS

European Search Report for Application No. 21189730.1; dated Feb. 1, 2022; 12 Pages.

(Continued)

*Primary Examiner* — An T Nguyen
(74) *Attorney, Agent, or Firm* — CANTOR COLBURN LLP

(57) ABSTRACT

A method of controlling access of a person (101) to an area that is accessed via an access point having an associated set of access rights, the method including: measuring a characteristic of a person; and based at least in part on the measured characteristic, classifying the person (101) as being in a high risk category of persons, wherein the associated set of access rights of the access point deny permission for the high risk category of persons to access the area.

13 Claims, 3 Drawing Sheets

(56) References Cited

U.S. PATENT DOCUMENTS

| | | | |
|---|---|---|---|
| 2021/0390804 A1* | 12/2021 | Rajamanickam | A61B 5/015 |
| 2021/0390807 A1* | 12/2021 | Chaurasia | G07C 9/27 |
| 2021/0390812 A1* | 12/2021 | Chaurasia | G01J 5/0025 |
| 2021/0391089 A1* | 12/2021 | Eswara | G16H 40/20 |
| 2022/0005298 A1* | 1/2022 | Shen | G01K 13/20 |
| 2022/0020483 A1* | 1/2022 | Saleh | G16H 50/80 |
| 2022/0044007 A1* | 2/2022 | Saleh | G06V 40/161 |

OTHER PUBLICATIONS

ZKTeco Europe: "ZKTeco Touchless Biometrics Solutions for Access Control", Youtube, Apr. 1, 2020 (Apr. 1, 2020), Apr. 1, 2020 (Apr. 1, 2020), p. 2 pp., XP054981282, Retrieved from the Internet: URL:https://www.youtube.com/watch?v=XFogpLExymk (no PDF copy available).

* cited by examiner

METHOD OF CONTROLLING ACCESS

FOREIGN PRIORITY

This application claims priority to Indian Patent Application No. 202011038142, filed Sep. 4, 2020, and all the benefits accruing therefrom under 35 U.S.C. § 119, the contents of which in its entirety are herein incorporated by reference.

TECHNICAL FIELD

The present disclosure relates to methods of and systems for controlling access of a person to an area. The concepts disclosed herein are particularly useful in, but not limited to, situations in which a person who poses a possible health risk to others (e.g. because they have a contagious disease) should be identified and denied access to communal areas where other persons are likely to be present.

BACKGROUND

It is known to control access to an area via access points. For example, it is commonplace to control access to rooms in buildings using electronic door readers that will only unlock a respective door if a user supplies the door reader with approved credentials. These credentials may be supplied to the door reader using an RFID card, mobile telephone, or similar device in the user's possession that has been configured to store the necessary approved credentials. Normally, these credentials are pre-set on the device before the device is issued to a user.

However, these systems do not take into account any real-time data on individual users. For example, once a user has been granted credentials that allow them to access a particular area, these credentials may not be updated until the device storing the credentials has been taken back from the user.

This causes particular issues in circumstances where there is a possible risk that a person with credentials allowing them to access to particular areas where many people will be present (e.g. in the case of a hotel, communal areas such as a gym, dining halls, swimming pool, or other amenities) may spread a contagious disease to other people in that area.

When a person is first infected with a contagious disease there may be a period in which they are largely asymptomatic and they may not be aware that they are infected. In this period they often still pose a risk of infection to others as they go about their normal lives. Even when a person first begins to show symptoms (e.g. a rise in their body temperature) they may not be aware of this for a period of time. As a result, by the time an infected person becomes aware of their own infection they may have already infected a large number of other people in a relatively short period of time.

In public buildings such as hotels, a scenario similar to that described above can lead to the shutdown of entire buildings once an infection has been discovered, as it may be discovered too late to isolate the infected person from others or from particular areas of the building. Thus, entire buildings may need to be disinfected/sanitized and/or entire groups of persons (e.g. all hotel guests) may have to be isolated from the general population for a period of time. This can lead to huge business losses in addition to the serious health risk posed to others and a loss of consumer confidence in the business in question.

There therefore exists a need in the art for methods of, and systems for, controlling access of a person to an area that take into account real time data, for example data that indicates a person may pose a risk of infection to other persons.

SUMMARY

According to a first aspect of the present invention there is provided a method of controlling access of a person to an area that is accessed via an access point having an associated set of access rights, the method comprising: measuring a characteristic of a person; and based at least in part on the measured characteristic, classifying the person as being in a high risk category of persons, wherein the associated set of access rights of the access point deny permission for the high risk category of persons to access the area.

By measuring a characteristic of a person and classifying the person as being in a high risk category of persons based on this measured characteristic, a person can be prevented from entering the area in order to ensure that other persons in that area are not put at risk.

The classifying of the person may be performed automatically based at least in part on the measured characteristic. More than one characteristic may be measured and more than one characteristic may be taken into account in classifying the person as being in a high risk category of persons.

The characteristic of the person may be any one or a combination of: their body temperature; their heart rate; or whether or not they are wearing a mask or face covering. It will be appreciated that body temperature and/or heart rate may be early indicators that a person is infected with an infectious disease.

It will also be appreciated that masks or face coverings are often used to reduce the risk of airborne contagious disease spreading. However, some persons are reluctant to wear such masks or face coverings (or are exempt from doing so, for medical reasons). The method may therefore be employed to identify and restrict access for any persons not wearing (or refusing to wear) a mask or face covering, thus preventing them from putting others in an area at risk, regardless of any symptoms of the person.

The classifying of the person based at least in part on the measured characteristic may comprise determining whether the measured characteristic is abnormal.

The measured characteristic may be body temperature, and classifying the person based at least in part on the measured characteristic may comprise determining whether the person's body temperature is above a predetermined threshold. The average normal body temperature of a human is generally accepted as 37° C., but the "normal" body temperature can fall within a wide range, for example, from 36.1° C. to 37.2° C. A temperature of over 38° C. may be indicative that the person has a disease. An appropriate threshold may then be set in consideration of the foregoing.

The characteristic of the person may be measured with a camera or sensor. In the case of the characteristic being the person's body temperature, this may be measured with a radio frequency (RF) camera, an infrared camera, a thermal imaging camera or an infrared sensor.

The characteristic of the person may be measured by wearable technology, such as a smartwatch. In order to obtain this measurement the method may comprise checking for and/or requesting access to the data from a person's own wearable device.

The measured characteristic may be heart rate, for example as measured by a wearable. Classifying the person based at least in part on the measured characteristic may comprise determining whether the person's heart rate is outside their usual range.

Additionally or alternatively (if for example it is detected that the person does not have a wearable) the method may comprise prompting the person to have their characteristic (for example, their heart rate) measured at an external standalone system.

The method may therefore comprise measuring the characteristic, such as heart rate, with an external standalone system. Such an external standalone system may be facilitated by staff (e.g. staff of a hotel as mentioned below).

The classifying of the person being in a high risk category of persons may take into account data on the person, this data may include the person's medical records. The method may comprise using a machine learning algorithm on the person's records or data in order to classify the person as being in a high risk category of persons. Such an algorithm may also be used to determine a frequency of measurements to be taken (discussed in more detail below) This data may include information stored on frequent customers such as their consent to have their characteristic measured and a desired frequency of measurements. This data can then be used to determine a frequency at which the characteristic of the person should be measured repeatedly (as discussed in more detail below).

The area may be a communal or common area. The area may be an area of a building, such as a particular room of a hotel. Communal areas where a large number of people can gather pose a particular risk of spreading infection rapidly and so it is particularly important to prevent high risk people from entering these areas. The method may therefore control access of a person to a plurality of such areas, for example to all communal areas of a hotel.

Rather than being a communal area, the area may be a secure area, for example an area usually accessibly only to certain authorised personnel. In certain situations, it would be desirable to limit access to these areas if the authorised personnel are ill. For example, it might be desirable to deny access to a restricted-access kitchen to kitchen staff, when they are deemed high risk.

The characteristic of the person may be measured when they are outside of the area. This prevents any risk from occurring to users inside of the area.

The person may be identified by a device in their possession. The device may be any one of: a smart device; a mobile device such as a smartphone; or an RFID card. This device may have a unique ID, for example in the case of a smartphone this may be a Bluetooth MAC ID and the person may be identified via this unique ID. The device may be configured to communicate with the access point in order for the person to gain access to the area. This communication may be wireless, for example via Bluetooth or other radio communication.

Classifying the person as being in a high risk category of persons may comprise appointing the unique ID of their device to the high risk category of persons. This may be done in a database and/or using a server storing such data on users.

The measuring of the characteristic of the person may be automatically triggered. This measuring may be triggered by a detection that the person is within a predetermined geo-fenced area and/or within a range of a wireless beacon. Such a detection may be performed by detecting a location of the device in the person's possession mentioned above, for example a device in their possession with GPS, Wi-Fi and/or Bluetooth capabilities.

The detection that the person is within a predetermined geo-fenced area may be based on a comparison of the GPS coordinates of the area and measured GPS coordinates of the person's device.

Alternatively, wireless beacons such as Wi-Fi routers near the area could be detected by the person's device, thus indicating that the person is within a predetermined range.

The characteristic may be measured using a characteristic measurement device that is arranged to carry out measurements of persons within the predetermined geo-fenced area and/or within the range of the wireless beacon. For example, the characteristic may be measured by a device located at the entrance to a building (e.g. a hotel) and the predetermined geo-fenced area and/or range of the wireless beacon may cover this entrance. In this way people can be detected and their characteristic may be measured as soon as they enter the building in order to minimise the risk they pose to others before being classified and in order to ensure that all people who enter the building have their characteristic measured. In one particular example, the device may be an RF camera, thermal imaging camera, or an infrared camera directed at the entrance of a building.

The measuring of the characteristic of the person may be automatically triggered by the person attempting to access a second area, this may be via a second access point. In this case the characteristic may be measured using a characteristic measurement device located at the second access point. The second access point may be a door within a building, for example a private room door in a hotel. The characteristic measurement device may be embedded at the second access point. In one example the device may be a temperature sensor integrated into a door handle. In another example, the device may be an infrared camera at the access point, this may be an infrared camera integrated into a peephole of a door.

The measuring of the characteristic of the person may be automatically triggered by the person gripping and/or turning a door handle associated with the second access point.

With the above described measurements triggered by the person attempting to access a second area, repeat measurements of the characteristic of the person may be taken and the category of the person may be updated accordingly.

The method may comprise temporarily delaying the person access to the second area via the second access point in order to allow time for the characteristic to be measured. For example, in the case of a private room door in hotel, there is a normal period of time in which a typical door is unlocked when a user accesses it (e.g. via a key card or mobile device). This time may be extended to be longer than the normal time in order to allow the measurement to be taken. In the case where the user is identified by device in their possession, the device may communicate with the second access point in order for the person to gain access to the second area. The device may contain and send instructions for the access point to delay access to the user for a period of time, for example at least 2 seconds, at least 3 seconds, at least 5 seconds or at least 10 seconds. The person may be delayed until it is confirmed a measurement has been taken.

The method may also comprise delaying the person in the predetermined geo-fenced area and/or range of the wireless beacon discussed above to allow time for the measurement to be taken.

The first area may a communal area and the second area may be a private area associated with the person. The second access point may have a second set of access rights that include permission for the person to enter the private area associated with them even if they are classified in the high risk category of persons.

In this way, the person can be denied access to communal areas to reduce the risk they pose to others but can be allowed into a private area (e.g. their private hotel room) in order to allow them to isolate themselves form other people, thus reducing the risk they pose to others.

The second set of access rights may deny access to other persons (e.g. all other persons, particular individual people or categories of people) so that the person can be isolated. For example, in the case of a private hotel room the second set of access rights may therefore prevent housekeeping staff from entering the room. The second set of access rights may be updated to deny access to other persons in this way only once the person has entered the second area.

The measuring of the characteristic may be performed repeatedly. As mentioned above this may be performed using other access points that the person attempts to access. Additionally or alternatively, the repeat measurement could be performed using another characteristic measurement device, for example a camera at the entrance of a building as previously discussed. The method may also comprise prompting the person to indicate to them that another measurement is required. This may be done after a predetermined period of time since the last measurement. The predetermined period may be approximately two hours, three hours or one day. The repeat measurements may be used to once again classify the person and if based at least in part on these measurement the person should no longer in a high risk category of persons the method may comprise re-classifying the person so they are not in the high risk category. This would allow the person to then access the area.

The method may comprise sending an alert if, based at least in part on the measured characteristic, the person is classified as being in the high risk category of persons. The alert may be sent to the person themselves, for example to their mobile device. The alert may instruct the person to isolate themselves from other persons, for example by going directly to their private hotel room. The alert may be sent to hotel staff, e.g. the front desk, and/or other persons that have been in close proximity to the person categorized as high risk and/or medical staff. Similar alerts may be sent for the re-classifying of the person as described above. An alert may be sent to a local doctor to arrange a visit to a person who is classified in the high risk category.

The method may comprise tracking where the person has been. Then, if they are classified in the high risk category of persons, other persons who have been in the same places may be alerted and/or instructed to isolate and the places the person has been may be sanitized. Such tracking may be performed using a device in the person's possession as discussed previously.

The location and/or path of the person may be displayed elsewhere, e.g. to hotel staff at a front desk in the hotel. If a person who is classified in the high risk category still attempts to access the area, an alert may be sent (e.g. to the front desk of a hotel) along with information on the path taken by the person.

The person's location may be tracked using wireless beacons that communicate with their device. These wireless beacons could be part of a Wi-Fi system, a lock system or other devices.

The location of the person may be determined by measuring a time for a communication signal to travel between the person's device and a wireless beacon (thus allowing the distance between the device and beacon to be calculated with a known signal speed) along with a measured angle of the signal between the two.

Historic data on the locations, movements and/or densities of people may be stored and used to understand where high risk persons were and/or what locations others may have been at risk.

In a second aspect, the present invention provides a system for controlling access of a person to an area that is accessed via an access point having an associated set of access rights, the system comprising: a controller that is configured to perform a method of controlling access rights according to the first aspect (including any of the optional features described above), and a characteristic measurement device in communication with the controller for measuring the characteristic.

As mentioned above, the characteristic may be body temperature and the characteristic measurement device may be any of the cameras or infrared sensors described herein.

The system may comprise a wireless beacon or a predetermined geo-fence and may be configured to automatically trigger the measurement of the characteristic by a detection of the person being within the predetermined geo-fence or within a range of the wireless beacon. The predetermined geo-fence and/or wireless beacon may be positioned to cover an entrance to a building and the system may configured to detect persons entering the building. As described above, this detection may be performed by detecting a location of a device in the person's possession, for example a device with GPS, Wi-Fi and/or Bluetooth capabilities. The method may begin with such a detection of the person.

As also described above, the characteristic may be measured by a device located at the entrance to a building (e.g. a hotel) and the predetermined geo-fence area and/or range of the wireless beacon may cover this entrance.

The area may be a first area of a building, and the building may be a hotel.

The building may comprise a second area that is accessed via a second access point, and the system may be arranged to automatically trigger the measurement of the characteristic when the person attempts to enter the second area. The first area may be a communal area and the second area may be a private area associated with the person. The second access point may have an associated second set of access rights that include permission for the person to enter the private area associated with them even if they are classified in the high risk category of persons.

In the case where the characteristic is a body temperature of the person, the measurement device may be a camera (e.g. an RF camera, an infrared camera, a thermal imaging camera, or an infrared sensor) at, optionally embedded in, the second access point. The second access point may comprise a door and the camera may be embedded in a peephole of the door.

Alternatively, the measurement device may be a sensor (e.g. an infrared sensor, an RF sensor or a thermal imaging sensor) and this may be embedded in the second access point. The access point may comprise a door handle and the system may be arranged so that the turning of the door handle by the person automatically triggers the measurement of the characteristic. The sensor may be embedded in the door handle and it may be configured such that it can measure the temperature of the person when they grip the door handle.

In another aspect, the present invention provides an access point for controlling access to an area, the access point comprising: a door; an access controller; a door lock controlled by the access controller and a measurement device for measuring a characteristic of a person.

The characteristic may be a body temperature of the person. The measurement device may be a radio frequency (RF) camera, an infrared camera, a thermal imaging camera, or an infrared sensor.

The measurement device may be embedded in the access point.

In the case of an infrared, thermal imaging or RF camera, this may be embedded in a peephole of the door.

In the case of an infrared sensor, this may be embedded in a handle of the door. The door handle and infrared sensor may be arranged to detect the body temperature of a person when they grip and/or turn the door handle.

The access controller may be configured to communicate with a device in the possession of a person wishing to gain access to the area, as described above. The access controller may be configured to communicate with other access controllers, e.g. via wireless communication such as Wi-Fi or Bluetooth.

In yet another aspect, the present invention provides a network of access points that are configured to communicate with one another and perform the method according to the first aspect (including any of the optional features described herein).

At least one of the access points may be an access point with the associated set of access rights described in relation to the first aspect, where such access rights deny permission for the high risk category of persons to access the area. This access point may be an access point to a common, communal or secure area as previously described.

At least one of the (other) access points may be an access point to a private area, such as the second access point described in relation to the second aspect. This access point may have a second set of access rights that include permission for the person to enter the private area associated with them even if they are classified in the high risk category of persons.

The network may be a mesh network.

The access points may be any of the access points as described above.

In yet another aspect, the present invention provides a server that is configured to communicate with access points such as those described above and perform the method according to the first aspect (including any of the optional features described herein).

The server may communicate with a network of access points such as those described above.

In yet another aspect the present invention provides a door handle comprising an integrated infrared sensor for measuring body temperature. The door handle may be arranged to detect the body temperature of a person when they grip and/or turn the door handle.

BRIEF DESCRIPTION OF THE DRAWINGS

Certain embodiments of the present invention will now be described, by way of example only, with reference to the accompanying drawings, in which.

DETAILED DESCRIPTION OF THE INVENTION

Figure 1:
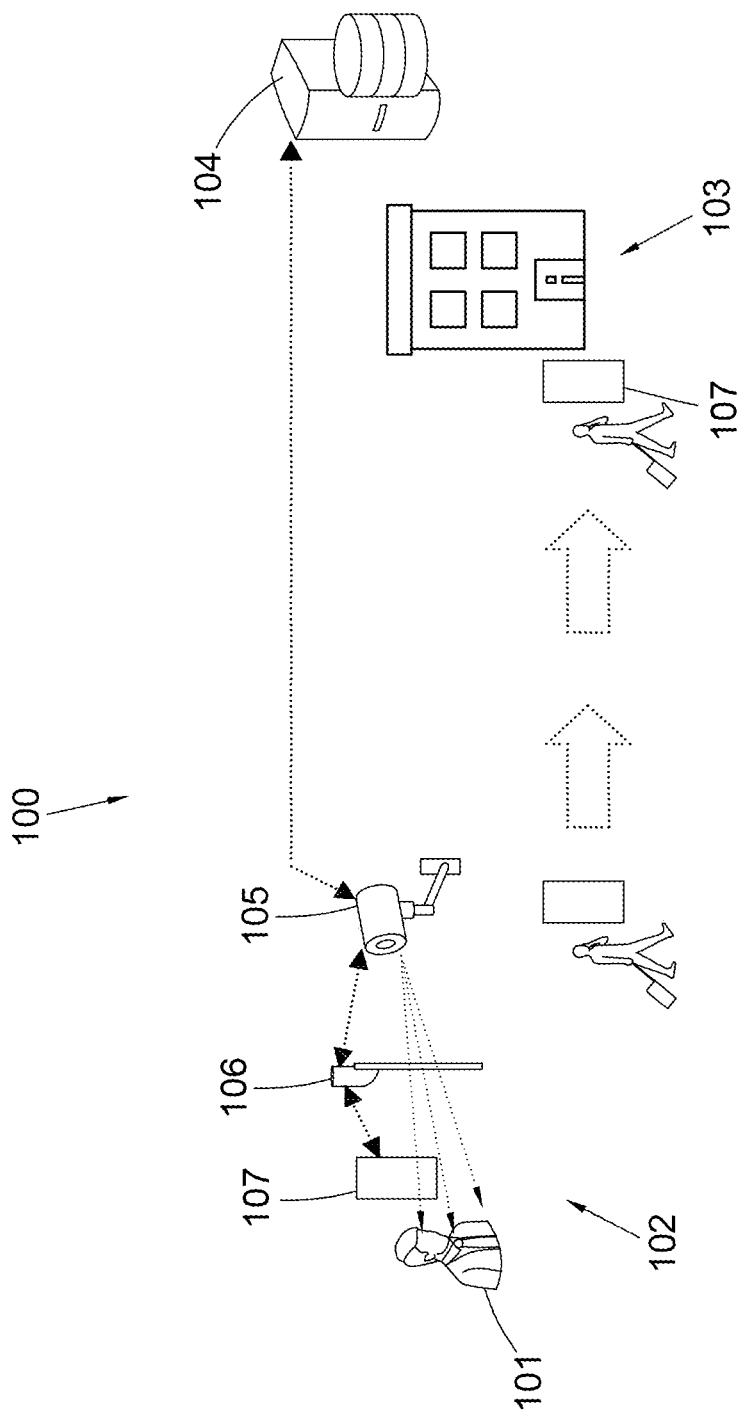
FIG. 1 is a schematic diagram of an access control system.

The access control system 100 shown in FIG. 1 controls access rights for a guest 101 in a hotel. The hotel comprises an entrance lobby 102 and private rooms 103. The hotel also has a dedicated server 104 connected to a Wi-Fi system of the hotel.

In the hotel lobby entrance lobby 102 there is an infrared camera 105 connected to the Wi-Fi system and in communication with the server 104. The infrared camera 105 is directed towards the entrance of the hotel so that it captures in its view anyone who enters the hotel. The infrared camera 105 is capable of detecting the body temperature of a person.

Each guest 101 is identified by a mobile device 107 in their possession that has a unique Bluetooth MAC address and Bluetooth/Wi-Fi capabilities. The Bluetooth MAC address of the device 107 corresponding to the guest is registered in a database of the hotel server 104 along with relevant access credentials for that person. The access credentials associated with the Bluetooth MAC address of the device 107 corresponding to the guest will allow them access to areas such as their private room 103 when they present the device to an access controller at their room door. As long as the person is not tagged as "sick" in the database of the hotel server 104 these access credentials will also provide them access to communal areas such as a hotel gym and dining hall.

When a guest 101 first enters the hotel at the hotel entrance 102 the Wi-Fi system of the hotel sends an advertisement signal from a wireless beacon 106 to the device 107 in the user's possession, the device 107 detects the advertisement signal and in response connects to the hotel Wi-Fi system.

The Bluetooth MAC address of the device 107 is recognized. This then triggers the infrared camera 105 to measure the body temperature of the guest 101 when they are near the entrance. Once this measurement has been taken it is communicated along with the Bluetooth MAC address of the device corresponding to the guest via the Wi-Fi system to the hotel server 104.

If the body temperature of the guest is over 38° C. (which may be indicative that the person has a disease) the hotel server 104 tags the person as "sick" in the database. This immediately prevents them from accessing any communal areas of the hotel.

The device 107 itself may store access credentials for the person and may download updated access credentials from the database via the Wi-Fi system when the person is tagged as "sick", these updated access credentials may prevent the person from accessing any communal areas of the hotel.

In these ways, access control rights of the guest 101 are adjusted whilst they are moving between the hotel entrance 102 and their hotel room 103.

A notification is sent to the device 107 of the guest 101 via the Wi-Fi network informing them that they have been tagged as sick due to their detected high body temperature which may indicate that they have a contagious disease. The guest 101 is instructed by a prompt on their device to go directly to their room 103 and isolate, for example, by displaying on their device 107 a location of their room 103 on a map of the hotel and/or providing directions to their room.

The location of the guest 101 can be determined by measuring a time for a communication signal to travel between the guest's device 107 and a router of the Wi-Fi system (thus allowing the distance between the device and router to be calculated with a known signal speed) along with a measured angle of the signal between the two.

Hotel staff are also made aware that the guest has been tagged as sick.

The movement of the guest 101 to their room 103 is tracked via their device 107 using the Wi-Fi network and instructions are sent to hotel staff to sanitise the areas that the guest 101 passed through on the way to their room 103. These instructions may be communicated via a mesh network of access controllers (described in more detail below), via Bluetooth, or through the Wi-Fi network.

Any other guests that were in close proximity with the guest 101 tagged as sick are also notified that they may be at risk via a prompt on their respective devices.

Figure 2:
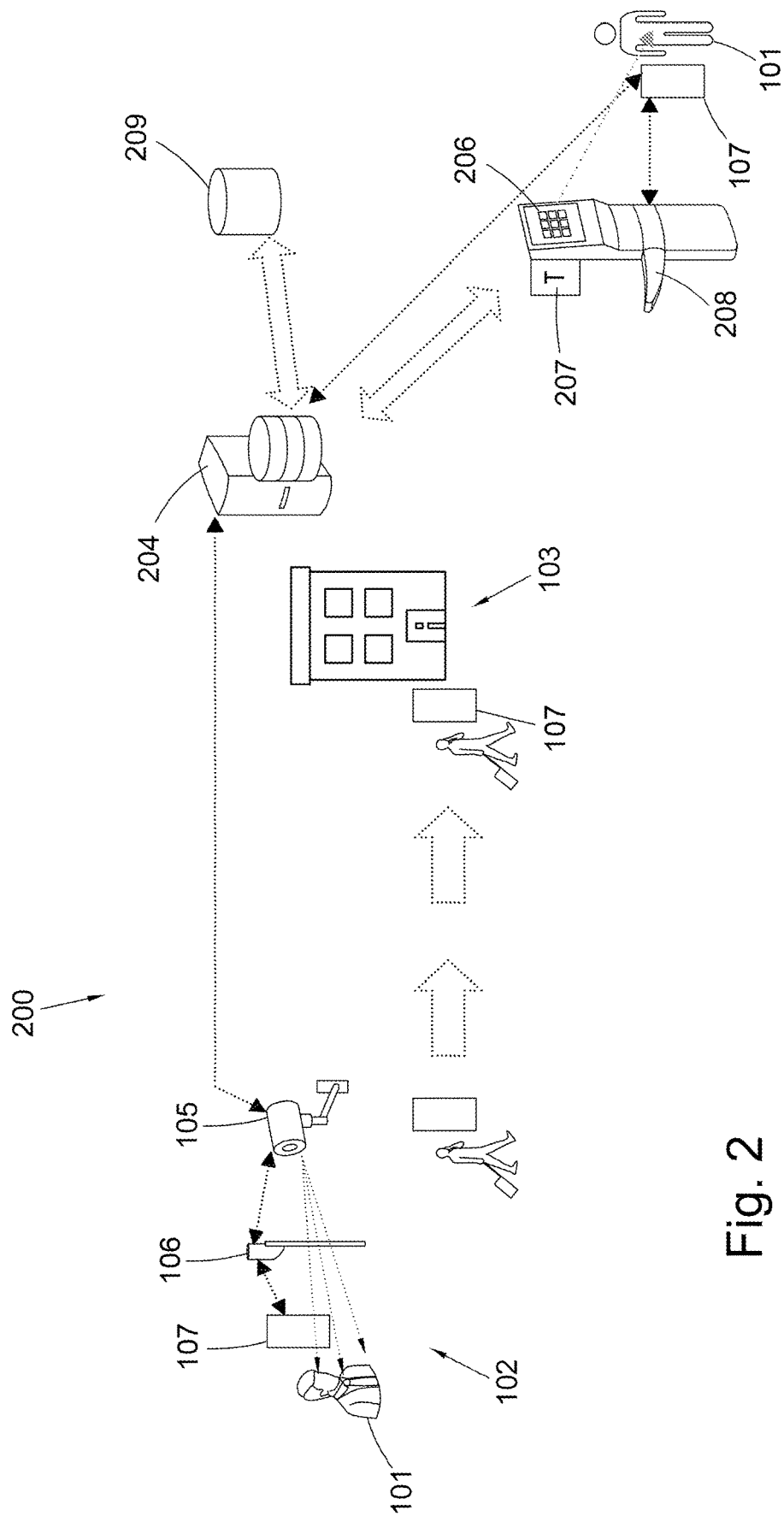
FIG. 2 is a schematic diagram of another access control system.

FIG. 2 shows another access control system 200, which is similar in arrangement and operation to the access control system 100 of FIG. 1. Like reference numbers represent similar features to those shown in the arrangement of FIG. 1.

In addition to the features described above, the access control system 200 of FIG. 2 includes an access controller 206 at each room door connected to a server 204 of the hotel via a mesh network of other access controllers at the door of each private room 103 or through the Wi-Fi network. The server 204 operates similarly to the server 104 described in relation to FIG. 1.

At each private room 103 there is also an infrared sensor 207 integrated into the door. This is in the form of an infrared camera integrated into the peephole of the door. Alternatively or additionally, this can be in the form of an infrared sensor built into a door handle 208 of the door that can measure the body temperature of the guest when they grip the door handle.

When the guest 101 attempts to access their room 103 they will present their device 107 to the access controller 206 of the door. The Bluetooth MAC address of the device 107 is recognized and, provided the guest has appropriate access credentials to enter (i.e. it is their room), access is granted. However, the door does not unlock until after a delay of at least 5 seconds. The delay time can be configured by staff, for example by a member of staff at the front desk of a hotel.

The guest 101 will turn the door handle of the door in order to enter their room 103 and this triggers the infrared sensor 207 to measure the guest's temperature. The 5 second delay mentioned above ensures that the guest 101 is in front of the infrared sensor 207 long enough for a measurement of their body temperature to be taken.

Once this measurement has been taken it is communicated along with the Bluetooth MAC address of the device 107 corresponding to the guest 101 via the Wi-Fi system or the mesh network of access controllers to the hotel server 204.

As described above, if the body temperature of the guest 101 is over 38° C. (which may be indicative that the person has a disease) the hotel server 204 tags the person as "sick" in the database. This immediately prevents them from accessing any communal areas of the hotel. This also prevents any other people from accessing their room, where they are now isolating.

The server 204 of the hotel also has access to additional data from a customer database 209. The server 204 may take into account additional data on the guest 101 from this database and this data may include the person's medical records. This data includes information stored on frequent customers such as their consent to have their characteristic measured and a desired frequency of measurements.

The access control system 200 monitors the body temperature of the guest 101 over time using repeated measurements at the door of the guest's room 103.

In order to achieve this a prompt is sent to the device 107 of the guest 101 to indicate to them when another measurement is required. This may be done after a predetermined period of time since the last measurement, in line with their indicated desired frequency, retrieved from customer database 209. Alternatively, the guest's medical records could be used with a machine learning algorithm that determines a suitable frequency of measurement based on a determination of the risk the person poses to others.

If the guest's temperature subsequently falls below 38° C. in repeated measurements the "sick" tag may be removed from the hotel database 204, thus allowing them access to communal areas. The removal of the sick tag may only occur after a number of measurements separated by a predetermined time period (e.g. two successive measurements) of the body temperature of the guest being below 38° C.; this being indicative that the person does not have a disease.

Figure 3:
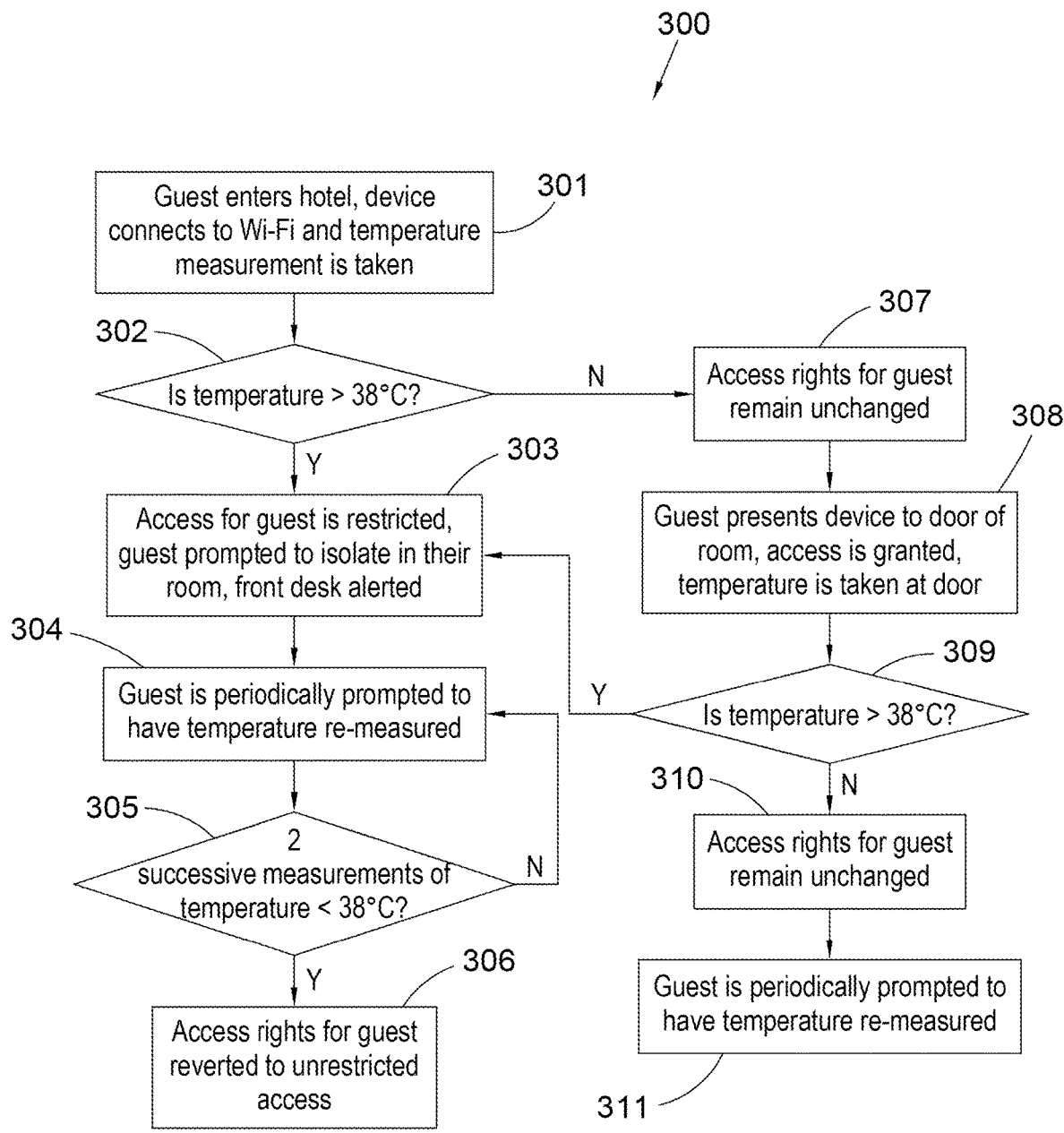
FIG. 3 is a flow chart of an access control method.

FIG. 3 shows a flow chart of an access control method 300 for controlling access to communal areas of a hotel. The method begins at step 301 when a guest enters a hotel; a device in their possession connects to a Wi-Fi system of the hotel and this then triggers an infrared camera to measure the body temperature of the guest when they are near the entrance, in a similar manner as previously described.

The method then proceeds to step 302, where if the body temperature of the guest is over 38° C. (which may be indicative that the person has a disease) they are tagged as "sick" and the method immediately proceeds to step 303 where their access rights are restricted, preventing them from accessing any communal areas of the hotel and the guest is instructed to self-isolate in their room via a prompt on their device. The front desk of the hotel is also alerted.

The method continues to step 304 where a guest is periodically prompted to have their body temperature re-measured. In order to monitor the body temperature of the guest over time repeated measurements at the door of the guest's room can be used (in a similar manner as previously described). A prompt is sent to the device of the guest to indicate to them when another measurement is required.

If the guest's temperature subsequently falls below 38° C. in 2 successive measurements at step 305 the method may proceed to step 306 where the "sick" tag is removed and their access rights are fully reverted to an unrestricted state, thus allowing them access to communal areas.

If at step 302 the guest's temperature is less than 38° C., the method instead proceeds to step 307 where their access rights remain unchanged so that they can still access communal areas.

However, the method then proceeds to step 308 when the guest presents their device at the door of their room in order to gain access as previously described. At each private room there is an infrared sensor integrated into the door. Once granted access, the guest will turn the door handle of the door in order to enter their room and this triggers the infrared sensor to measure the guest's temperature.

At step 309, if the body temperature of the guest is over 38° C. (which may be indicative that the person has a disease they are tagged as "sick" and the method immediately proceeds to step 303 described above where their access rights are restricted, preventing them from accessing any communal areas of the hotel and the guest is instructed to self-isolate in their room via a prompt on their device. The front desk of the hotel is also alerted.

If at step 309 the guest's temperature is less than 38° C., the method instead proceeds to step 310 where their access rights remain unchanged and they can still access communal areas. However, at step 310 they are still periodically prompted to have their body temperature re-measured, similar to step 304 described above, and the method returns to step 309 each time their temperature is measured. In this way, the body temperature of the guest can be monitored over time and if at any point their temperature indicates they may be a risk to others their access to communal areas can be restricted and they can be prompted to self-isolate in their room.

What is claimed is:

1. A method of controlling access of a person to a first area that is accessed via an access point having an associated set of access rights, the method comprising:
measuring a characteristic of a person; and
based at least in part on the measured characteristic, classifying the person as being in a high risk category of persons, wherein the associated set of access rights of the access point deny permission for the high risk category of persons to access the first area;
wherein the measuring of the characteristic of the person is automatically triggered by the person attempting to access a second area via a second access point, wherein the characteristic is measured using a characteristic measurement device located at the second access point;
wherein the first area is a communal area and the second area is a private area associated with the person, wherein the second access point has a second set of access rights that include permission for the person to enter the private area associated with them even if they are classified in the high risk category of persons.

2. A method as claimed in claim 1, wherein the characteristic of the person is any one or a combination of: their body temperature; their heart rate; or whether or not they are wearing a mask or face covering.

3. A method as claimed in claim 1, wherein the person is identified by a device in their possession that has a unique ID, wherein the device is configured to communicate with the access point in order for the person to gain access to the first area, and wherein classifying the person as being in a high risk category of persons comprises appointing the unique ID of their device to the high risk category of persons.

4. A method as claimed in claim 1, wherein the measuring of the characteristic of the person is automatically triggered by a detection that the person is within a predetermined geo-fenced area and/or within a range of a wireless beacon, wherein the characteristic is measured using a characteristic measurement device that is arranged to carry out measurements of persons within the predetermined geo-fence area and/or within the range of the wireless beacon.

5. A method as claimed in claim 1, wherein the method comprises temporarily delaying the person access to the second area via the second access point in order to allow time for the characteristic to be measured.

6. A method as claimed in claim 1, wherein the measuring of the characteristic is performed repeatedly, wherein the method preferably comprises prompting the person to indicate to them that another measurement is required after a predetermined period of time since the last measurement.

7. A method as claimed in claim 1 comprising sending an alert if, based at least in part on the measured characteristic, the person is classified as being in the high risk category of persons.

8. A system for controlling access of a person to a first area that is accessed via an access point having an associated set of access rights, the system comprising:
a controller that is configured to perform a method of controlling access rights as claimed in claim 1, and
a characteristic measurement device in communication with the controller for measuring the characteristic.

9. A system as claimed in claim 8, wherein the characteristic is body temperature and the characteristic measurement device is a thermal imaging camera, a radio frequency (RF) camera, an infrared camera or an infrared sensor.

10. A system as claimed in claim 8, wherein the system comprises a wireless beacon or a predetermined geo-fence and is configured to automatically trigger the measurement of the characteristic by a detection of the person being within the predetermined geo-fence or within a range of the wireless beacon.

11. A system as claimed in claim 10, wherein the predetermined geo-fence and/or wireless beacon are positioned to cover an entrance to a building and the system is configured to detect persons entering the building.

12. A system as claimed in claim 8, wherein the first area is an area of a building, the building comprises the second area.

13. A system as claimed in claim 12, wherein the characteristic is a body temperature of the person and the measurement device is either:
A) a thermal imaging camera, a radio frequency (RF) camera, or an infrared camera embedded in the second access point, wherein the access point preferably comprises a door and the camera is preferably embedded in a peephole of the door; or
B) an infrared sensor embedded in the second access point, wherein the access point preferably comprises a door handle and the system is arranged so that the turning of the door handle by the person automatically triggers the measurement of the characteristic.

* * * * *